United States Patent
Desai et al.

(10) Patent No.: US 11,954,345 B2
(45) Date of Patent: Apr. 9, 2024

(54) TWO-LEVEL INDEXING FOR KEY-VALUE PERSISTENT STORAGE DEVICE

(71) Applicant: Samsung Electronics Co., Ltd., Suwon-si (KR)

(72) Inventors: Omkar Desai, Syracuse, NY (US); Changho Choi, San Jose, CA (US); Yangwook Kang, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/668,312

(22) Filed: Feb. 9, 2022

(65) Prior Publication Data

US 2023/0176758 A1  Jun. 8, 2023

Related U.S. Application Data

(60) Provisional application No. 63/285,802, filed on Dec. 3, 2021.

(51) Int. Cl.
G06F 3/06 (2006.01)

(52) U.S. Cl.
CPC .......... *G06F 3/0638* (2013.01); *G06F 3/0604* (2013.01); *G06F 3/0679* (2013.01)

(58) Field of Classification Search
CPC ...... G05B 13/00–048; G05B 15/00–02; G05B 17/00–02; G06F 1/00–3296;

(Continued)

(56) References Cited

U.S. PATENT DOCUMENTS 5,204,958 A    4/1993  Cheng et al.
10,061,693 B2  8/2018  Kim
(Continued)

FOREIGN PATENT DOCUMENTS

CN   110888886 A   3/2020
CN   113157694 A   7/2021
(Continued)

OTHER PUBLICATIONS

Ajitesh Srivastava, Angelos Lazaris, Benjamin Brooks, Rajgopal Kannan, and Viktor K. Prasanna. Sep. 2019. Predicting memory accesses: the road to compact ML-driven prefetcher. In Proceedings of the International Symposium on Memory Systems. Association for Computing Machinery, New York, NY, USA (Year: 2019).*

(Continued)

*Primary Examiner* — Daniel C. Chappell
(74) *Attorney, Agent, or Firm* — Lewis Roca Rothgerber Christie LLP

(57) ABSTRACT

A system and method for two-level indexing for key-value persistent storage. The method may include: sorting two or more key-value pairs to form a sorted key-value pair set; determining an address of a first key-value pair of the key-value pairs, the first key-value pair including a first key and a first value; determining an address of a second key-value pair of the key-value pairs, the second key-value pair including a second key and a second value; and training a first linear regression model to generate a first line corresponding to the key-value pairs, the training including training the first linear regression model with key-value pairs including the first key-value pair and the second key-value pair.

20 Claims, 12 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 10,387,302 B2* | 8/2019 | Qiu | G06F 3/0679 |
| 10,489,291 B2 | 11/2019 | Hsu et al. | |
| 10,515,064 B2* | 12/2019 | Bennett | G06F 16/2228 |
| 10,649,969 B2 | 5/2020 | De | |
| 10,725,988 B2* | 7/2020 | Boles | G06F 16/2246 |
| 10,915,546 B2* | 2/2021 | Tomlinson | G06F 16/2246 |
| 11,100,071 B2* | 8/2021 | Tomlinson | G06F 16/2246 |
| 2015/0193491 A1 | 7/2015 | Yang et al. | |
| 2017/0017411 A1* | 1/2017 | Choi | G06F 3/0611 |
| 2017/0300407 A1* | 10/2017 | Qiu | G06F 3/0653 |
| 2018/0364937 A1 | 12/2018 | Ki et al. | |
| 2019/0034833 A1* | 1/2019 | Ding | G06N 20/00 |
| 2019/0042240 A1* | 2/2019 | Pappu | G06F 3/0683 |
| 2019/0042611 A1* | 2/2019 | Yap | H04L 69/22 |
| 2019/0108267 A1 | 4/2019 | Lyakas et al. | |
| 2019/0138612 A1 | 5/2019 | Jeon et al. | |
| 2021/0011634 A1* | 1/2021 | Tumkur Shivanand | G06F 3/0622 |
| 2021/0089498 A1* | 3/2021 | Park | G06F 16/137 |
| 2021/0109679 A1* | 4/2021 | Guim | G06F 3/0679 |
| 2021/0181963 A1* | 6/2021 | Choi | G06F 3/0607 |
| 2021/0248107 A1 | 8/2021 | Hou et al. | |
| 2021/0314404 A1* | 10/2021 | Glek | G06F 11/2041 |

FOREIGN PATENT DOCUMENTS

| | | |
|---|---|---|
| CN | 113268457 A | 8/2021 |
| CN | 113722319 A | 11/2021 |
| WO | WO 2019/098871 A1 | 5/2019 |
| WO | WO 2021/139376 A1 | 7/2021 |

OTHER PUBLICATIONS

Y. Sun, S. Feng, Y. Ye, X. Li and J. Kang, "A Deep Cross-Modal Hashing Technique for Large-Scale SAR and VHR Image Retrieval," 2021 SAR in Big Data Era (BIGSARDATA), Nanjing, China, 2021, pp. 1-4, doi: 10.1109/BIGSARDATA53212.2021.9574218. (Year: 2021).*

H. Aggarwal, R. R. Shah, S. Tang and F. Zhu, "Supervised Generative Adversarial Cross-Modal Hashing by Transferring Pairwise Similarities for Venue Discovery," 2019 IEEE Fifth International Conference on Multimedia Big Data (BigMM), Singapore, 2019, pp. 321-330, doi: 10.1109/BigMM.2019.000-2. (Year: 2019).*

Choi, H. et al., "A Survey of Machine Learning-Based System Performance Optimization Techniques", Applied Sciences, Apr. 4, 2021, pp. 1-19.

Kraska, T. et al., "The Case for Learned Index Structures", Research 6: Storage & Indexing, SIGMOD'18, Jun. 10-15, 2018, Houston, Texas, USA, pp. 489-504.

Marcus, R. et al., "Benchmarking Learned Indexes", Jun. 29, 2020, pp. 1-14, arWiv:2006.12804v2.

EPO Extended European Search Report dated Apr. 21, 2023, issued in corresponding European Patent Application No. 22204634.4 (13 pages).

* cited by examiner

|  | Read | Update/Del |
|---|---|---|
| Hot | Good to Learn | Not good to learn |
| Cold | Good to Learn | Good to learn |

FIG. 6

TWO-LEVEL INDEXING FOR KEY-VALUE PERSISTENT STORAGE DEVICE

CROSS-REFERENCE TO RELATED APPLICATION(S)

The present application claims priority to and the benefit of U.S. Provisional Application No. 63/285,802, filed Dec. 3, 2021, entitled "TWO LEVEL MEMORY EFFICIENT INDEXING FOR KV SSD USING LINEAR REGRESSION", the entire content of which is incorporated herein by reference.

FIELD

One or more aspects of embodiments according to the present disclosure relate to persistent storage, and more particularly to a two-level indexing system for key-value persistent storage.

BACKGROUND

Key-value storage devices have various uses for data storage, e.g., in server systems. In such a storage device, data may be stored as values, each value being identified by a respective key, and a host using the key-value storage device may, for example, send a read request (or "Get command") including a key, the key identifying the value to be read from storage.

It is with respect to this general technical environment that aspects of the present disclosure are related.

SUMMARY

In some embodiments, a key-value persistent storage device includes two indexing systems for mapping keys to values, (i) a hash table, and (ii) recursively indexed storage. The hash table may be employed when new key-value pairs are written to the key-value persistent storage device, and periodically, e.g., when wear levelling or garbage collection is performed, some of the key-value pairs (e.g., ones that are determined to be longer-lived than others) may be moved to the recursively indexed storage. The recursively indexed storage may employ a tree structure (e.g., a tree of linear models) to map keys to value storage locations, with higher levels, including internal nodes, in the tree directing any query related to a key toward a lower level, external node, which includes a linear mapping from keys to addresses in persistent storage.

According to an embodiment of the present disclosure, there is provided a method, including: sorting two or more key-value pairs to form a sorted key-value pair set; determining an address of a first key-value pair of the key-value pairs, the first key-value pair including a first key and a first value; determining an address of a second key-value pair of the key-value pairs, the second key-value pair including a second key and a second value; and constructing a model based on the first key-value pair, the address of the first key-value pair, the second key-value pair, and the address of the second key-value pair.

In some embodiments, the method further includes performing a data-moving operation in a block of a key-value persistent storage device, the performing of the data-moving operation including identifying the two or more key-value pairs.

In some embodiments, the data-moving operation is a wear-leveling operation.

In some embodiments, the method further includes storing the sorted key-value pair set in a region of storage, wherein the determining of the address of the first key-value pair includes determining a first address at which the first key-value pair is stored.

In some embodiments: the constructing of the model includes training a first linear regression model to generate a first line corresponding to the key-value pairs, the training including training the first linear regression model with key-value pairs and corresponding addresses, including the first key-value pair, the address of the first key-value pair, the second key-value pair, and the address of the second key-value pair; and the method further includes: receiving a command to access a third key-value pair of the two or more key-value pairs, and determining, based on the first line, an approximate address of the third key-value pair.

In some embodiments, the determining of the approximate address includes multiplying a key of the key-value pair by a factor and adding an offset, the factor and the offset being based on a slope and offset of the first line.

In some embodiments: the constructing of the model includes training a first linear regression model to generate a first line corresponding to the key-value pairs, the training including training the first linear regression model with key-value pairs and corresponding addresses, including the first key-value pair, the address of the first key-value pair, the second key-value pair, and the address of the second key-value pair; and the method further includes: determining that a difference between an approximate address for the first key-value pair, based on the first line, and the address of the first key-value pair exceeds a threshold; and training a second linear regression model to generate a second line corresponding to a first subset of the key-value pairs, the training including training the second linear regression model with the first subset of the key-value pairs.

In some embodiments, the threshold is the difference between the address of the first key-value pair and a page boundary.

In some embodiments, the method further includes: receiving a command to access a key-value pair of the two or more key-value pairs, and determining that the key-value pair is in the first subset.

In some embodiments, the method further includes determining an approximate address of the key-value pair based on the second line.

In some embodiments, the method further includes reading, from persistent storage, a page, the approximate address being within the page.

According to an embodiment of the present disclosure, there is provided a key-value persistent storage device, including: persistent storage; a buffer; and a processing circuit, configured to: sort two or more key-value pairs to form a sorted key-value pair set; determine an address of a first key-value pair of the key-value pairs, the first key-value pair including a first key and a first value; determine an address of a second key-value pair of the key-value pairs, the second key-value pair including a second key and a second value; and construct a model based on the first key-value pair, the address of the first key-value pair, the second key-value pair, and the address of the second key-value pair.

In some embodiments, the processing circuit is further configured to perform a data-moving operation in a block of a key-value persistent storage device, the performing of the data-moving operation comprising identifying the two or more key-value pairs.

In some embodiments, the data-moving operation is a wear-leveling operation.

In some embodiments, the processing circuit is further configured to store the sorted key-value pair set in a region of storage, wherein the determining of the address of the first key-value pair includes determining a first address at which the first key-value pair is stored.

In some embodiments: the constructing of the model includes training a first linear regression model to generate a first line corresponding to the key-value pairs, the training including training the first linear regression model with key-value pairs and corresponding addresses, including the first key-value pair, the address of the first key-value pair, the second key-value pair, and the address of the second key-value pair; and the processing circuit is further configured to: receive a command to access a third key-value pair of the two or more key-value pairs, and determine, based on the first line, an approximate address of the third key-value pair.

In some embodiments, the determining of the approximate address includes multiplying a key of the key-value pair by a factor and adding an offset, the factor and the offset being based on a slope and offset of the first line.

In some embodiments: the constructing of the model includes training a first linear regression model to generate a first line corresponding to the key-value pairs, the training including training the first linear regression model with key-value pairs and corresponding addresses, including the first key-value pair, the address of the first key-value pair, the second key-value pair, and the address of the second key-value pair; and the processing circuit is further configured to: determine that a difference between an approximate address for the first key-value pair, based on the first line, and the address of the first key-value pair exceeds a threshold; and train a second linear regression model to generate a second line corresponding to a first subset of the key-value pairs, the training including training the second linear regression model with the first subset of the key-value pairs.

In some embodiments, the threshold is the difference between the address of the first key-value pair and a page boundary; and the processing circuit is further configured to: receive a command to access a key-value pair of the two or more key-value pairs, and determine that the key-value pair is in the first subset.

In some embodiments, the processing circuit is further configured to determine an approximate address of the key-value pair based on the second line.

According to an embodiment of the present disclosure, there is provided a key-value persistent storage device, including: persistent storage; a buffer; and means for processing, configured to: sort two or more key-value pairs to form a sorted key-value pair set; determine an address of a first key-value pair of the key-value pairs, the first key-value pair including a first key and a first value; determine an address of a second key-value pair of the key-value pairs, the second key-value pair including a second key and a second value; and construct a model based on the first key-value pair, the address of the first key-value pair, the second key-value pair, and the address of the second key-value pair.

BRIEF DESCRIPTION OF THE DRAWINGS

These and other features and advantages of the present disclosure will be appreciated and understood with reference to the specification, claims, and appended drawings wherein:

FIG. 6 is a table of factors for determining whether to move data to recursively indexed storage, according to an embodiment of the present disclosure;

DETAILED DESCRIPTION

The detailed description set forth below in connection with the appended drawings is intended as a description of exemplary embodiments of a two-level indexing system for key-value persistent storage provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Key-value persistent storage devices (such as key-value solid state drives (SSDs)) have various uses for data storage, e.g., in server systems. In such a storage device, data may be stored as values, each value being identified by a respective key, and a host using the key-value persistent storage device may, for example, send a read request (or "Get command") including a key, the key identifying the value to be read from storage. The key-value persistent storage device may include persistent storage (e.g., flash memory, organized into blocks (the smallest unit that may be erased) and pages (the smallest unit that may be read or written)) and a buffer (e.g., dynamic random-access memory (DRAM)). In operation, the hash table may be stored in the buffer for faster operation. The hash table may include each key and a pointer to the location, in persistent storage, of the corresponding value. If the keys are large (e.g., larger than 255 bytes) then the hash table may not fit into the buffer, necessitating costly swapping of the buffer with data stored in the persistent storage. Some key-value persistent storage devices may therefore limit the permissible maximum key size, which may be an inconvenient constraint for some users or applications.

Figure 1:
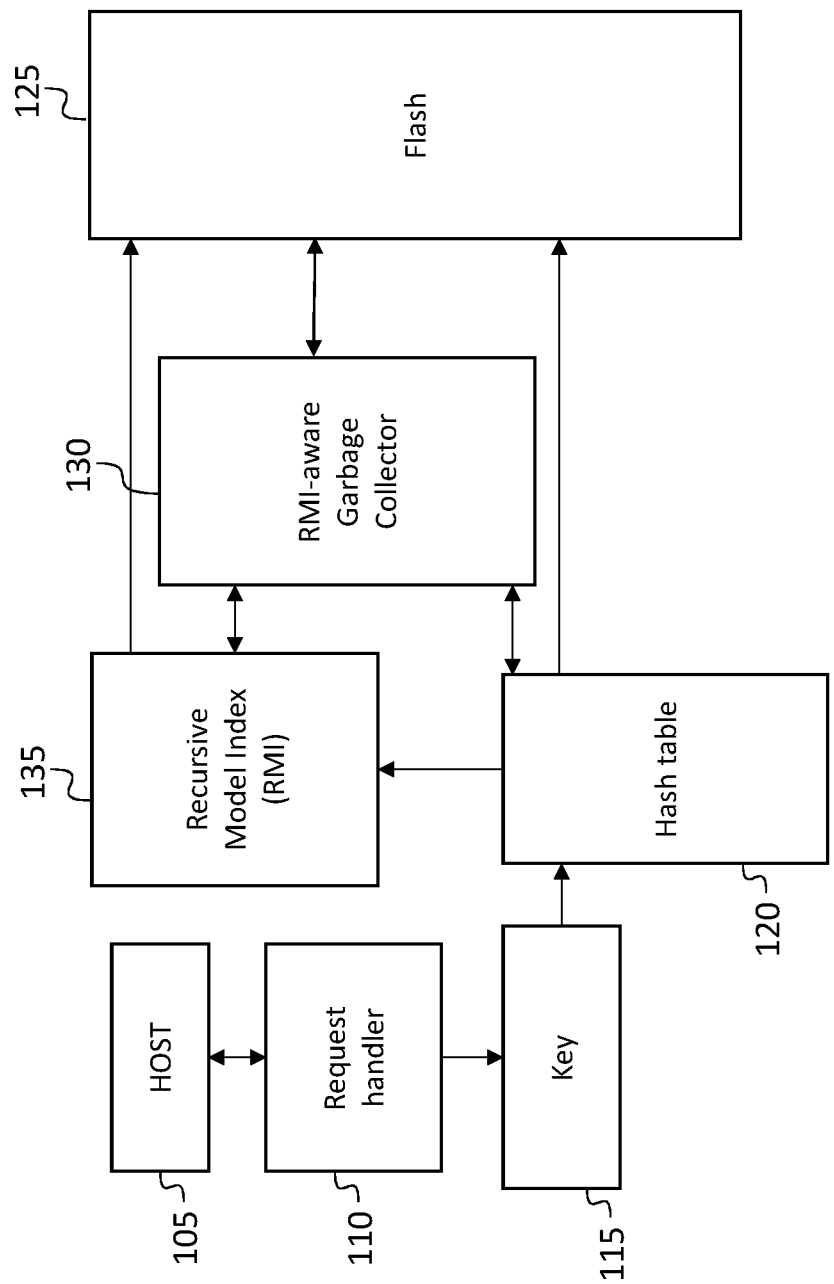
FIG. 1 is a hybrid block and flow diagram of a host and a key-value persistent storage device, according to an embodiment of the present disclosure.

As such, in some embodiments, the size of a hash table of a key-value persistent storage device may be reduced by moving some key-value pairs to one or more separately maintained storage pools referred to herein as "recursively indexed storage". Referring to FIG. 1, when a new key-value pair is to be written to the key-value persistent storage device, a host 105 may make a request to a request handler 110, which may forward the key 115 to the key-value persistent storage device. In the key-value persistent storage device the key and the corresponding value may first be indexed using a hash table 120, and the key and value may be saved in persistent storage (e.g., flash memory) 125.

During data-moving operations (for blocks storing key-value pairs indexed using the hash table), such as wear leveling operations, garbage collection operations, or data-moving operations to avoid irrecoverable read-disturb errors, long-lived key-value pairs may be identified as, for example, key-value pairs that have remained unchanged for a long time or key-value pairs that remain valid in a block in which garbage collection is being performed. This identification may be performed, for example, by a data-moving circuit or method (e.g., a garbage collector or a wear-leveling circuit or method) that is aware of the availability of recursively indexed storage (which, in the case of a garbage collector, may be referred as an "RMI-aware garbage collector" 130). Such key-value pairs may be moved to recursively indexed storage, as discussed in further detail below, by a recursive model index circuit (RMI circuit) 135.

Figure 2:
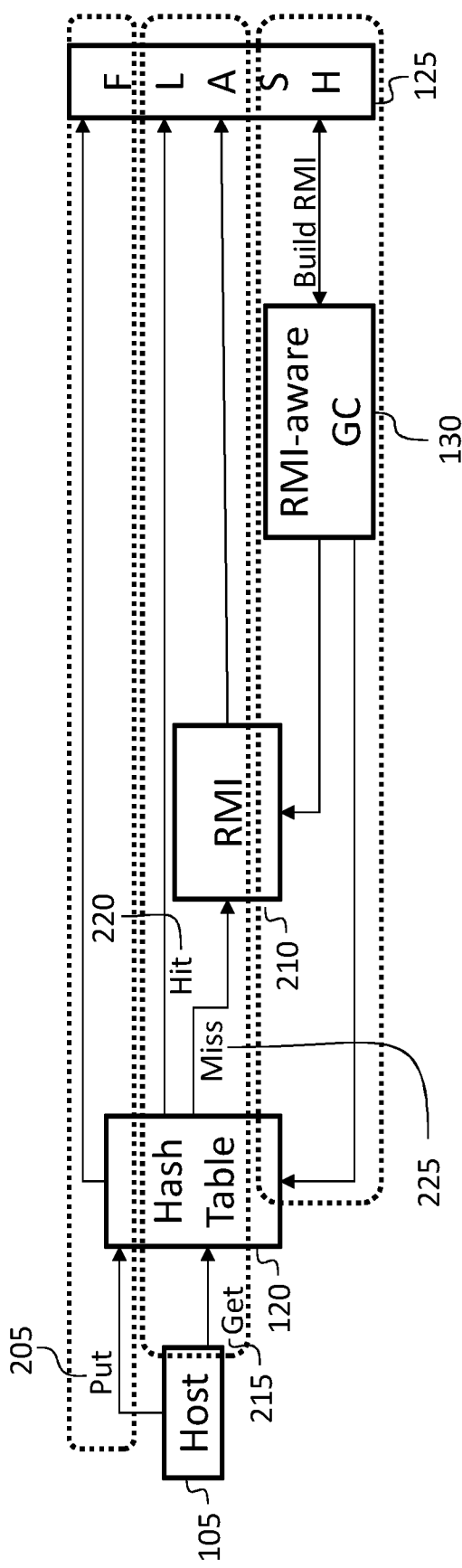
FIG. 2 is a data flow diagram showing various key-value operations, according to an embodiment of the present disclosure.

FIG. 2 shows operations that may be performed by the system of FIG. 1. When a Put operation is performed, at 205, by the host 105, the hash table 120 may be used to store the key and a pointer to the associated value. As mentioned above, the RMI-aware garbage collector 130 may, when performing garbage collection, identify (as candidates for moving) and move some of the key-value pairs to recursively indexed storage 210. In some embodiments, the set of key-value pairs may instead be identified and moved by an RMI-aware circuit for wear leveling or by an RMI-aware circuit for performing data-moving operations to avoid irrecoverable read-disturb errors. When a Get operation is performed, at 215, the key may be looked up in the hash table 120; if it is present (i.e., if a hash table hit occurs, at 220), the value may be returned based on the pointer to the value that is stored in the hash table 120. If the key is not present (i.e., if a hash table miss occurs, at 225), the key may instead be looked up in the recursively indexed storage 210 (as discussed in further detail below).

Figure 3:
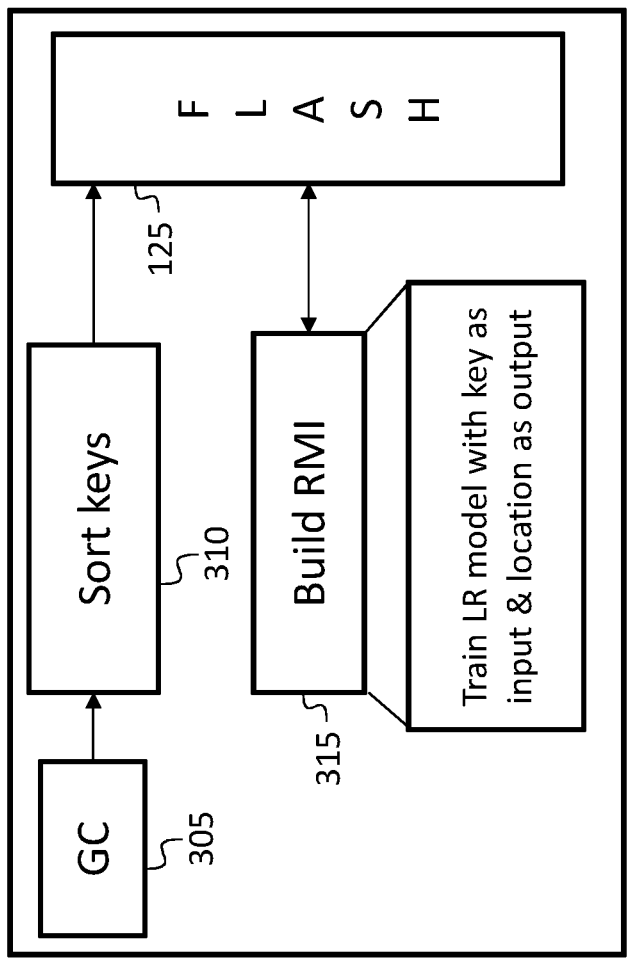
FIG. 3 is a hybrid block and flow diagram showing operation of a key-value persistent storage device, according to an embodiment of the present disclosure.

A recursive model index may be generated as follows. Referring to FIG. 3, garbage collection 305 (performed by the RMI-aware garbage collector 130) may identify a set of key-value pairs to be stored in recursively indexed storage 210. As mentioned above, in some embodiments, the set of key-value pairs may instead be identified by an RMI-aware circuit for wear leveling or by an RMI-aware circuit for performing data-moving operations to avoid irrecoverable read-disturb errors. These key-value pairs may be sorted, at 310, in order of their keys, to form a sorted key-value pair set, and the sorted key-value pair set may be stored, in that order, in the persistent storage 125. Once all of the key-value pairs have been stored, a storage location (or address) may be associated with each key, the address specifying where in the persistent storage 125 the key-value pair is stored (e.g., the first address (of what may be a plurality of addresses spanning the region of storage which the key-value pair occupies) at which the first key-value pair is stored). As such, the keys and corresponding storage locations form a set of ordered pairs that may be referred to as a "storage mapping". A recursive model index (RMI) may then be constructed, at 315; this may involve, as illustrated, training a linear regression (LR) model with key as input and storage location (or address) as output. In some embodiments, the model is expected to only predict locations of keys that were a part of the model fitting process, or the absence of a key (e.g., if the page that is identified by the model as corresponding to the key does not contain the key).

For example, an RMI may be constructed based on the storage mapping, as follows. The recursive model index may be a multi-stage or "multi-level" model tree that may be traversed for any key of the storage mapping, to find an approximate address for the key. As used herein, an "approximate address" for a key is an address that identifies the page containing the key-value pair (e.g., an address in the same page as the address of the key-value pair, or an address differing from the address of the key-value pair by less than the difference between the address of the key value pair and a page boundary). As such, an approximate address is sufficient for reading the first portion of the key-value pair from persistent storage 125 (without having to perform additional read operations from persistent storage 125 to find the key-value pair); once a page containing the key-value pair has been read into the buffer of the key-value persistent storage device, the first portion of the key-value pair may be found by searching the memory buffer. In some embodiments, a delimiter (a reserved bit sequence, which may be sufficiently long (e.g., at least 80 bits long, or at least 128 bits long, or at least 256 bits long) that the likelihood of its appearing by random chance is acceptably small) is used to mark the start of each key-value pair in storage.

The RMI may include one or more internal nodes and one or more external nodes. Each internal node may, in operation, receive keys and map each key to another node, in the next level of the tree (e.g., if the internal node is in the second level, it may map each key to a respective node in the third level). Each external node may, in operation, receive keys and map each key into a respective approximate address. Each external node may include a linear regression model (e.g., a function for a straight line, of the form y=ax+b) that, given a key (as a value for x) returns the approximate address as the value for y (e.g., the approximate address may be calculated by multiplying the key by a factor (e.g., multiplying by the factor a) and adding an offset (e.g., adding the offset b) (where a and b are based on the slope and offset of the first line). The linear regression model may be trained by fitting the function to a subset of the storage mapping. The RMI may be constructed by (i) fitting a first straight line to the entire storage mapping, and then calculating a measure of how well the resulting line fits the storage mapping. If the fit is sufficiently good (e.g., if it successfully calculates an approximate address for each key of the storage mapping) then the construction of the RMI may terminate, and the RMI may consist of a single external node. The first straight line (which, in this example is the RMI) may then be used to find an approximate address for any key in the storage mapping.

Figure 4:
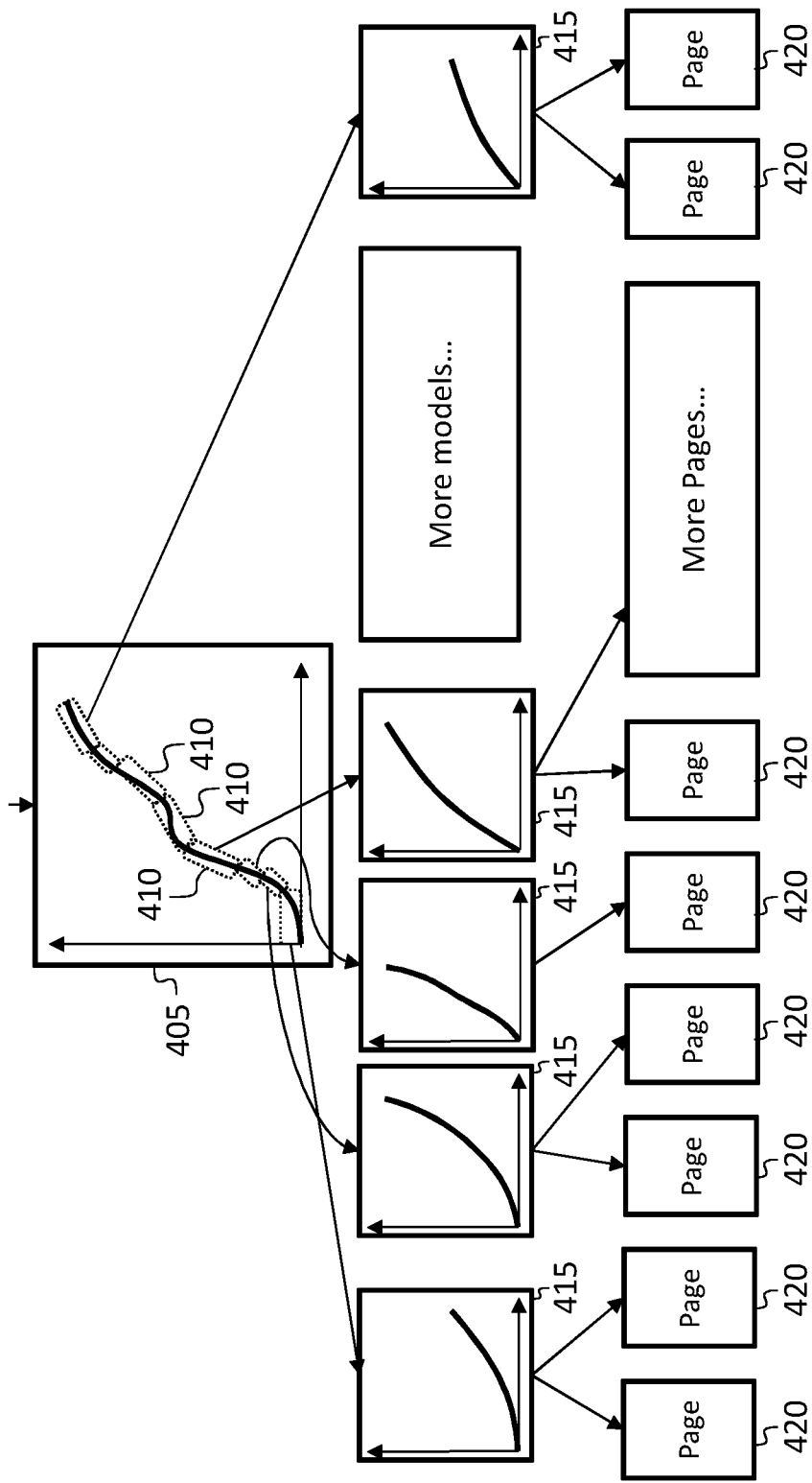
FIG. 4 is a block diagram of a recursive model index, according to an embodiment of the present disclosure.

FIG. 4 shows a two-level RMI for a storage mapping. In general, if the first straight line is not a sufficiently good fit to the storage mapping (as is the case for the storage mapping of FIG. 4), then the first node 405 (the root node of the tree) may become an internal node. The storage mapping is divided into subsets 410 of contiguous keys (e.g., evenly, such that each subset contains nearly the same number of keys) and a respective linear regression model may be trained for each of the subsets 410. This process is illustrated in FIG. 4, in which, in the root node 405 of the tree, is shown a graph of the storage mapping, with keys on the horizontal axis and addresses on the vertical axis. This graph shows a storage mapping that is not a very good fit to a straight line, and that has therefore been divided into a plurality (in the example of FIG. 4, eight) subsets. Each subset is assigned to a node in the second level of the tree as shown. In each second-level node 415 a respective linear regression model is trained and tested to assess whether it is sufficiently good (e.g., whether it successfully calculates an approximate address for each key of the subset 410). Each second-level node 415 for which the linear regression model is sufficiently good becomes an external node, and is used, in operation, to map keys to approximate address, e.g., to pages 420, as shown. In the example of FIG. 4, all of the second level nodes are external nodes. In other examples, some or all of the second level nodes may be internal nodes (because linear fits to their respective subsets of the storage mapping do not produce acceptable approximate addresses), and a third level (and possibly one or more additional levels beyond the third level) may be present.

When the persistent storage 125 is flash memory, the recursively indexed storage may occupy a plurality of blocks in the persistent storage 125, and a separate RMI may be constructed for each block. When a key is to be looked up in the recursively indexed storage, a coarse lookup table may be employed to determine which block the key and value are stored in, and the RMI for that block may then be employed to identify the page within which the key and value (or a first portion of the key and value) are stored. The structure of the recursive model index may make it unnecessary to keep a large number of keys in the buffer of the key-value persistent storage device; instead, the recursive model index may only use, for each internal node, a set of key boundaries (key values that are at the boundaries between subsets of keys) and, for each external node, the factor (a) and the offset (b) defining the line of the linear regression model. As such, the keys may be relatively large; e.g., the size of each key may be up to a value between 100 bytes and 1 MB (e.g., up to 100 kB).

Figure 5A:
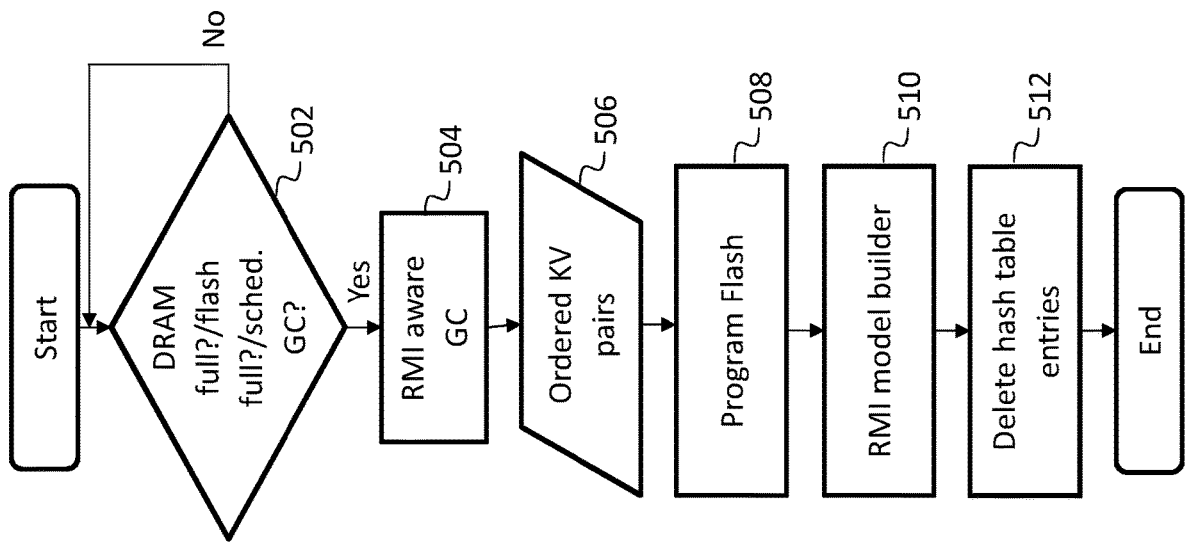
FIG. 5A is a flowchart of a method for constructing a recursive model index, according to an embodiment of the present disclosure.

FIG. 5A shows a flowchart for the construction of an RMI. At 502, if it is determined that the buffer of the key-value persistent storage device is full, the persistent storage 125 is full, or scheduled garbage collection is due to run, then at 504, the RMI-aware garbage collector 130 runs, identifying a set of key-value pairs for storing in the recursively indexed storage. As mentioned above, in some embodiments, the set of key-value pairs may instead be identified by an RMI-aware circuit for wear leveling or by an RMI-aware circuit for performing data-moving operations to avoid irrecoverable read-disturb errors. The key-value pairs are sorted, to form a sorted key-value pair set 506, which is stored, at 508 in the persistent storage 125. An RMI model is then built, at 510 (e.g., according to the method illustrated in FIG. 4 and described in the accompanying text), and the hash table entries for the key-value pairs stored in the recursively indexed storage are deleted, at 512.

Figure 5B:
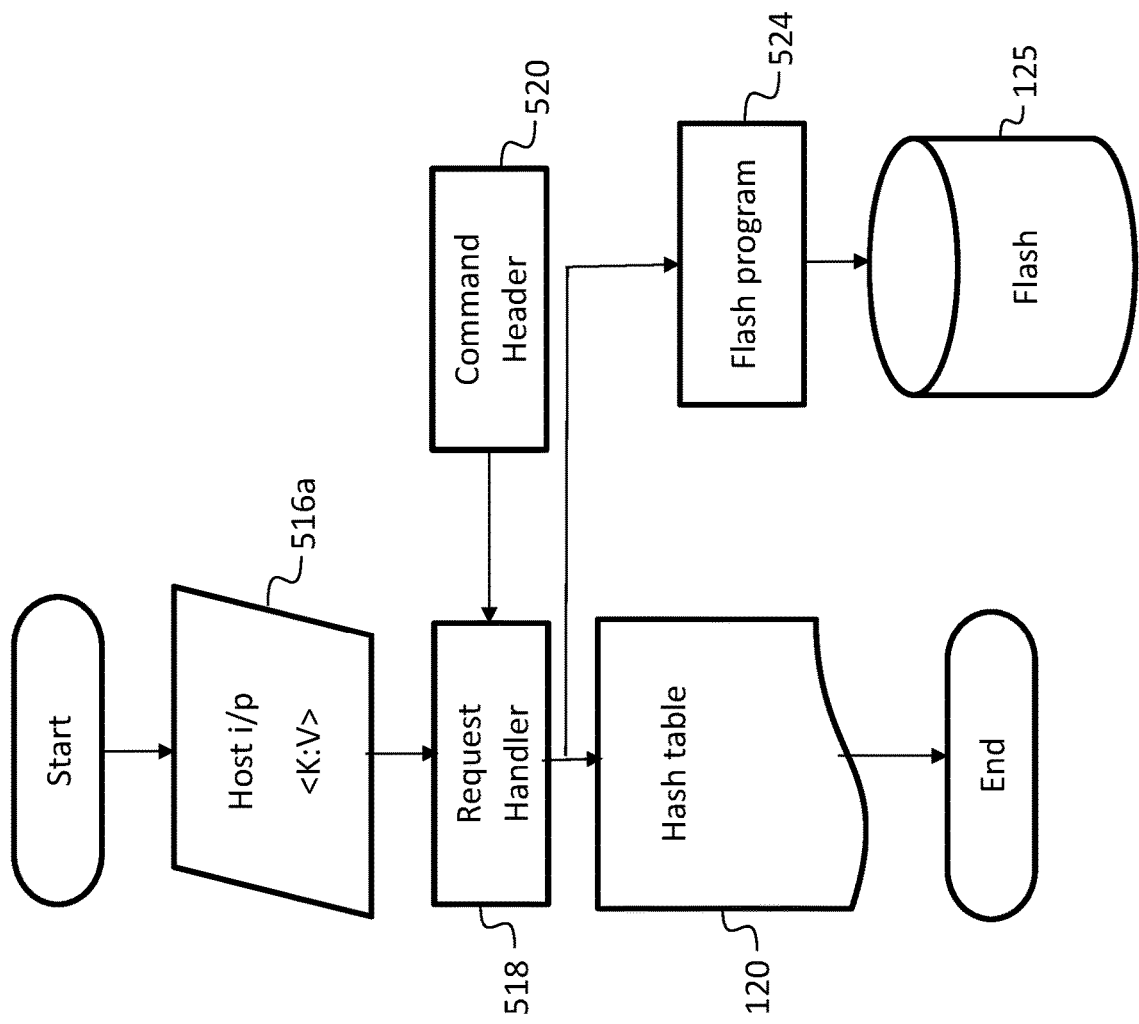
FIG. 5B is a flowchart of a method for performing a Put operation, according to an embodiment of the present disclosure.

FIG. 5B shows a method for performing a Put operation, in some embodiments. At 516a input (i/p) (e.g., a Put command, along with a key-value pair ("<K:V>")) from the host 105 is received, and initially accepted and queued for execution, at 518, by the request handler 110. From the command header 520, the request handler 110 identifies the operation to be performed, and the key is stored, along with a pointer to the value, in the hash table 120 (e.g., device DRAM), and at 524, the value is stored in persistent storage 125.

Figure 5C:
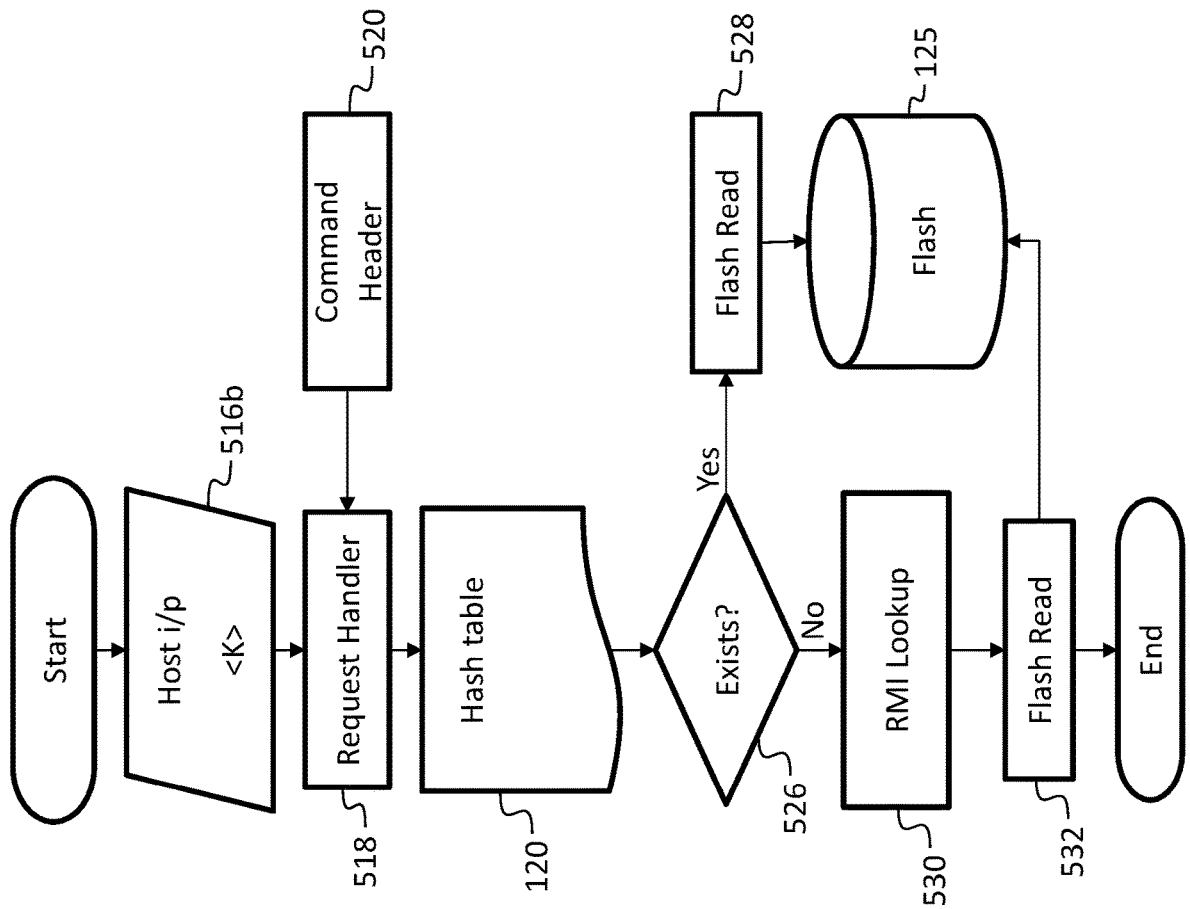
FIG. 5C is a flowchart of a method for performing a Get operation, according to an embodiment of the present disclosure.

FIG. 5C shows a method for performing a Get operation, in some embodiments. At 516b input (i/p) (e.g., a Get command, along with a key ("<K>")) from the host 105 is received, and initially accepted and queued for execution, at 518, by the request handler 110. From the command header 520, the request handler 110 identifies the operation to be performed, and the hash table 120 is checked for the presence of the key. If, as determined at 526, the key exists in the hash table 120, then the value is, at 528, read from the persistent storage 125 and returned to the host 105. If the key does not exist in the hash table 120, then the storage address is looked up, at 530, in the recursively indexed storage, and the value is read, at 523, from the persistent storage 125 and returned to the host 105 host 105.

Figure 5D:
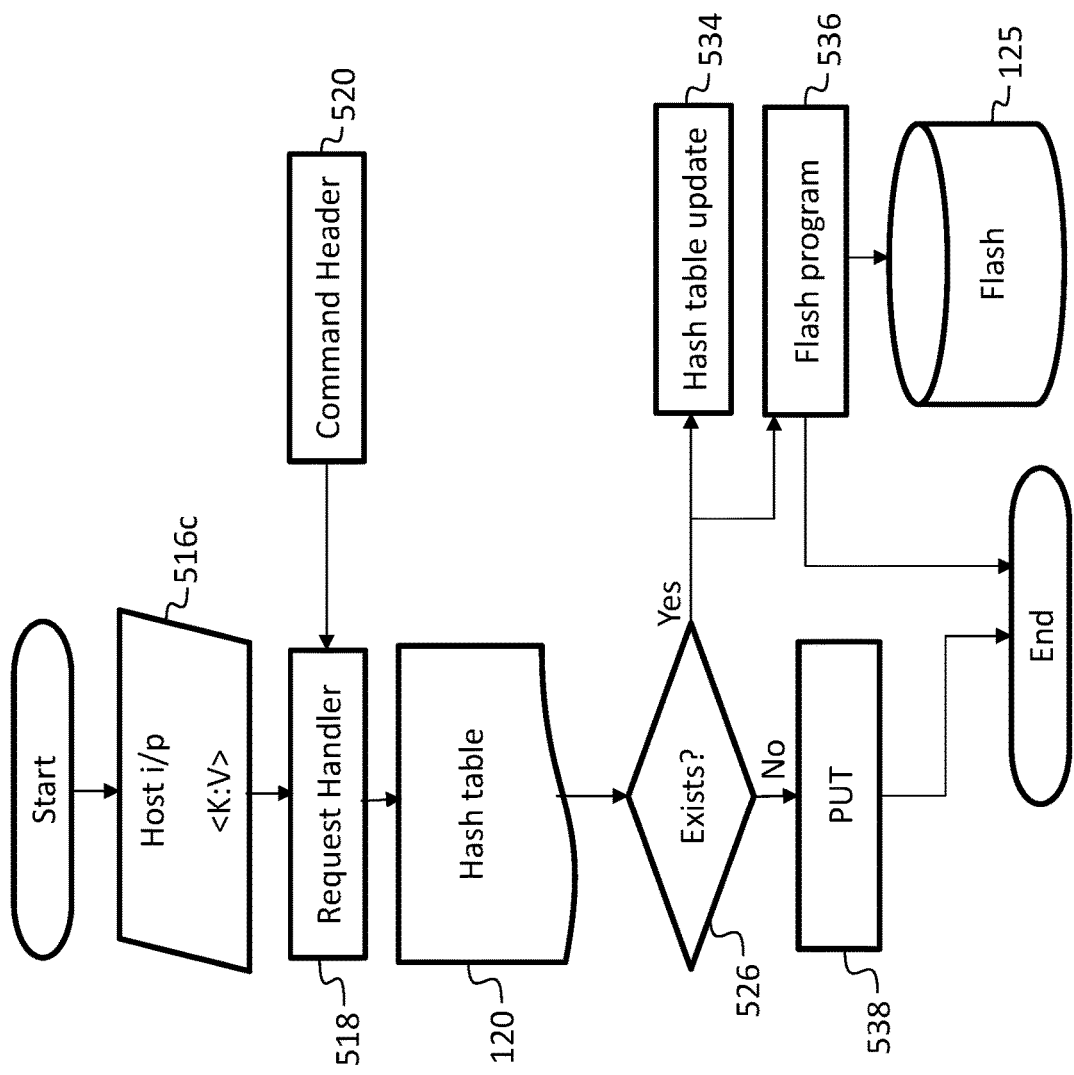
FIG. 5D is a flowchart of a method for performing an update operation, according to an embodiment of the present disclosure.

FIG. 5D shows a method for performing an update operation, in some embodiments. At 516c input (i/p) (e.g., an update command, along with a key-value pair ("<K:V>")) from the host 105 is received, and initially accepted and queued for execution, at 518, by the request handler 110. From the command header 520, the request handler 110 identifies the operation to be performed, and the hash table 120 is checked for the presence of the key. If, as determined at 526, the key exists in the hash table 120, then, at 534, the hash table 120 is updated with the new address for the value, and, at 536, the updated value is saved to persistent storage 125. If the key does not exist in the hash table 120, then a Put operation is performed, at 538. The absence of the key from the hash table 120 may imply that the key-value pair is stored in recursively indexed storage. In some embodiments, after the Put operation, the old value may remain in the recursively indexed storage; the presence of this old value in the recursively indexed storage may be harmless because a subsequent Get operation will result in the hash table 120 being checked first, and the key being found there, so that the old value will not be retrieved from the recursively indexed storage 210.

Figure 5E:
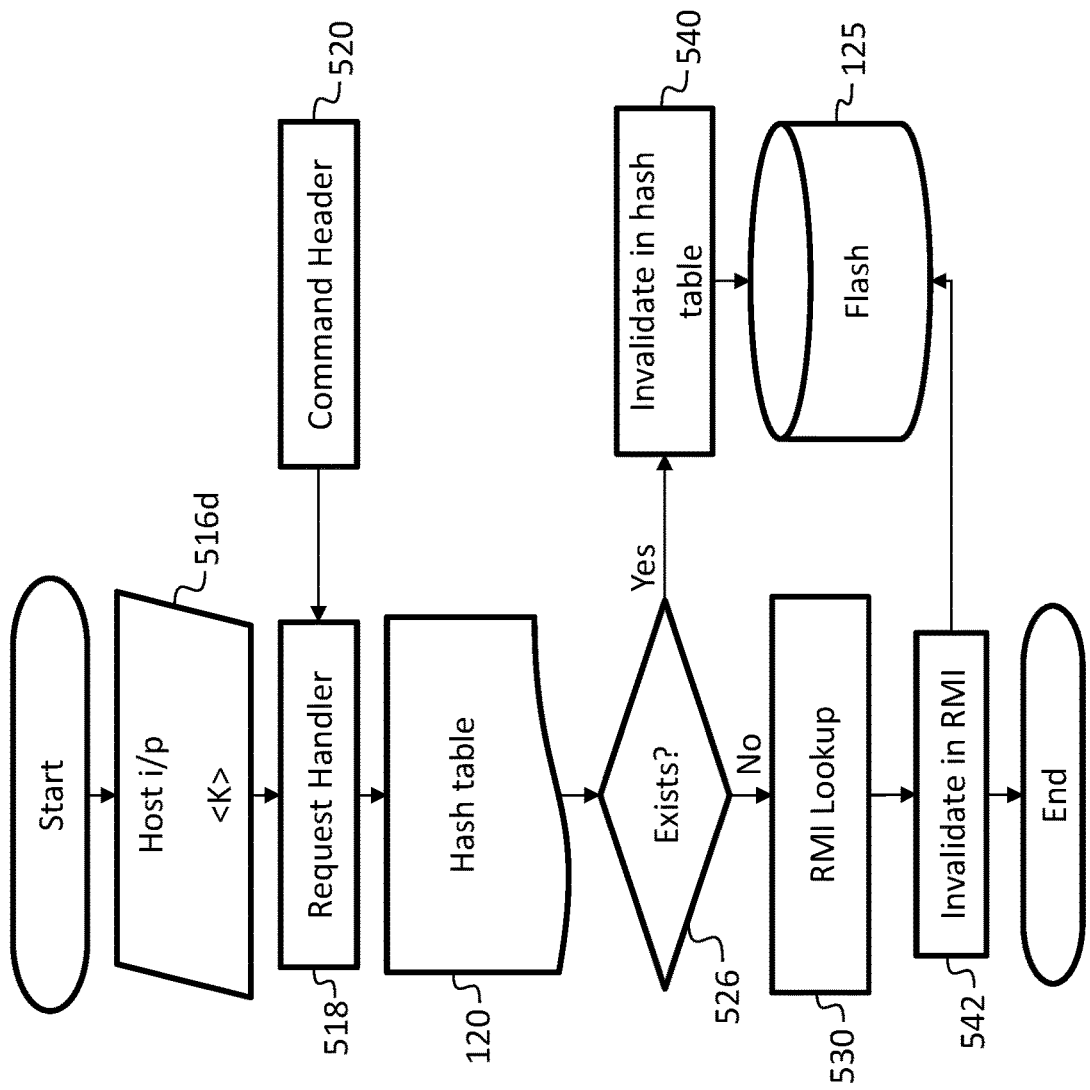
FIG. 5E is a flowchart of a method for performing a delete operation, according to an embodiment of the present disclosure.

FIG. 5E shows a method for performing a delete operation, in some embodiments. At 516d input (i/p) (e.g., a delete command, along with a key ("<K>")) from the host 105 is received, and initially accepted and queued for execution, at 518, by the request handler 110. From the command header 520, the request handler 110 identifies the operation to be performed, and the hash table 120 is checked for the presence of the key. If, as determined at 526, the key exists in the hash table 120, then the value is, at 540, invalidated in the hash table and from the persistent storage 125. If the key does not exist in the hash table 120, then the storage address is looked up, at 530, in the recursively indexed storage, and the value is invalidated, at 542, in the persistent storage 125.

In some embodiments, the RMI-aware garbage collector 130 may employ various factors to identify blocks in which garbage collection is to be performed (e.g., blocks that are to be erased, after any valid data are moved). Similarly, in some embodiments, an RMI-aware circuit for wear leveling or by an RMI-aware circuit for performing data-moving operations to avoid irrecoverable read-disturb errors may employ the same factors or analogous factors to identify blocks from which data are to be moved. These factors may include, for example, the number of invalidated keys in the block, the average key size, and the device memory pressure (e.g., the fraction of the storage device buffer currently being used). Another factor may be an "access frequency factor", the value of which may be set based on the table of FIG. 6. For example, a key-value pair may be (i) "hot" or "cold" for read operations (e.g., it may be read frequently or infrequently), (ii) "hot" or "cold" for update or delete operations (e.g., it may be updated or deleted frequently or infrequently) and (iii) "hot" or "cold" for write operations (e.g., it may be written frequently or infrequently). As the table of FIG. 6 shows, key-value pairs that are cold for updates and deletes may be better candidates for storing in the recursively indexed storage than key-value pairs that are hot for updates and deletes. This preference may be part of the motivation for using garbage collection as an opportunity to move key-value pairs to recursively indexed storage, because key-value pairs that remain valid in a block when garbage collection is performed may tend to be ones that outlived other key-value pairs written to the same block. This preference may similarly motivate the operation, as an opportunity to move long-lived key-value pairs to recursively indexed storage, of an RMI-aware circuit for wear leveling or of an RMI-aware circuit for performing data-moving operations to avoid irrecoverable read-disturb errors because such circuits may, as part of their ordinary functionality, be aware of long-lived key-value pairs.

Figure 7:
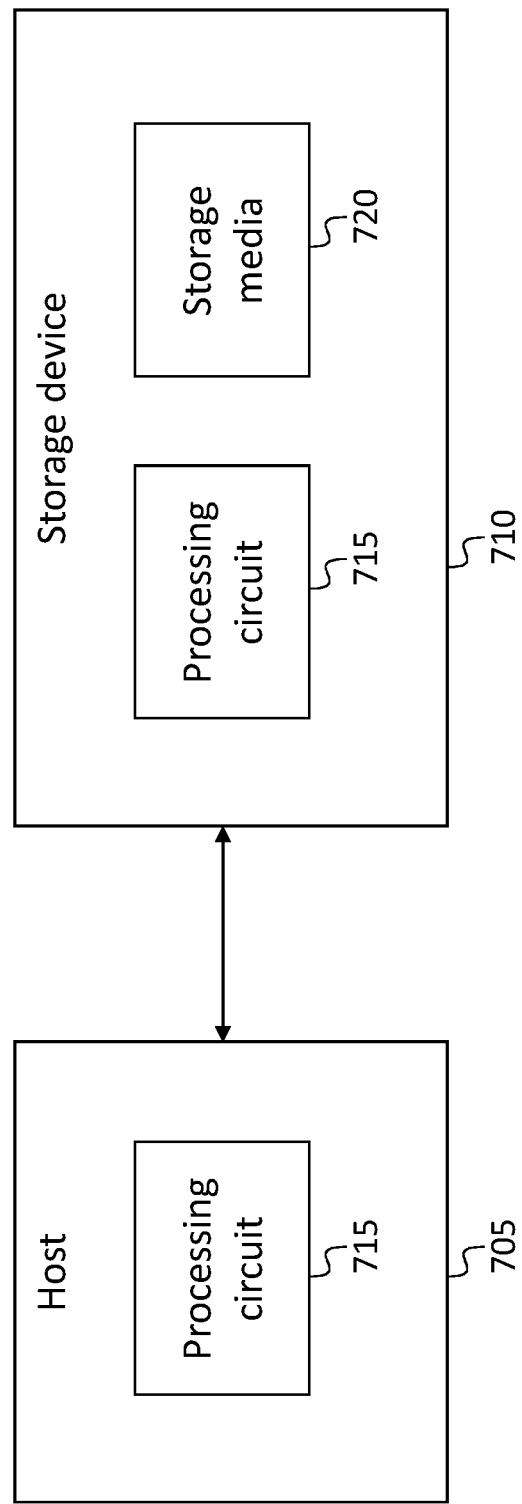
FIG. 7 is a block diagram of a host and a key-value persistent storage device, according to an embodiment of the present disclosure.
Figure 8:
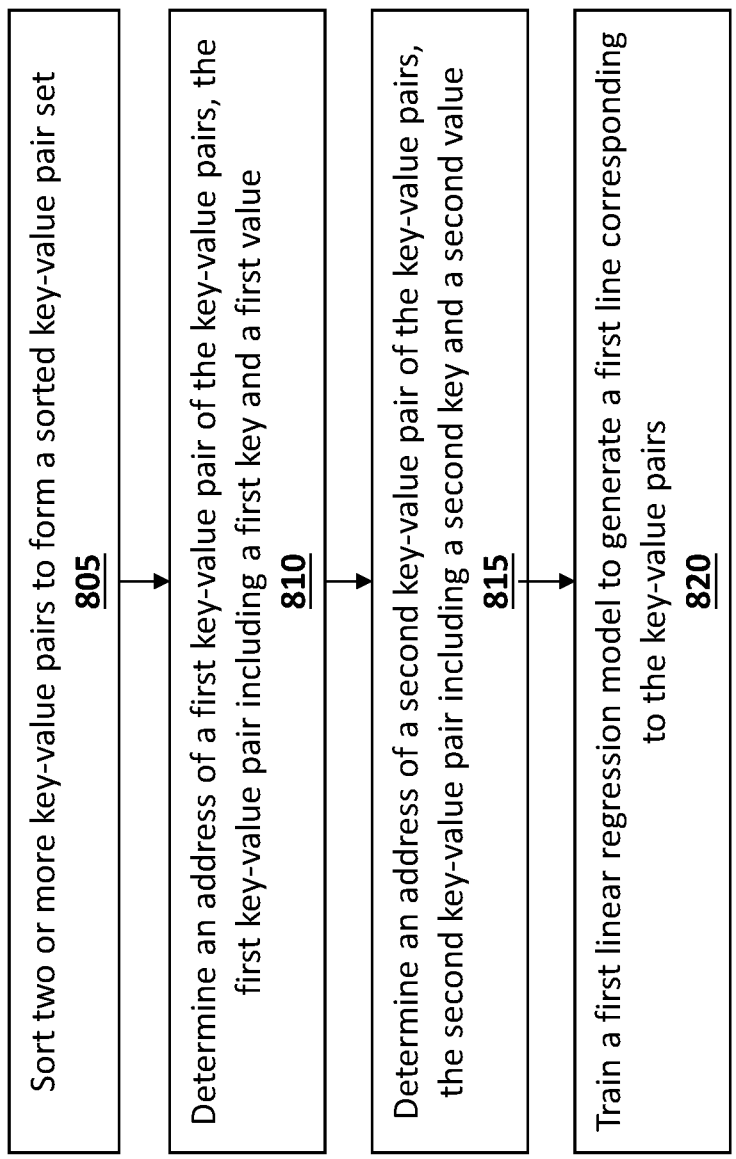
FIG. 8 is a flowchart of a portion of a method for constructing a recursive model index, including training a recursive model index to generate a fit line corresponding to a set of key-value pairs, according to an embodiment of the present disclosure.

FIG. 7 is a block diagram of a host 705 and a storage device 710 (which may be a key-value persistent storage device). The storage device 710 may have a form factor that is any one of a plurality of form factors suitable for persistent storage devices, including but not limited to 2.5", 1.8", MO-297, MO-300, M.2, and Enterprise and Data Center SSD Form Factor (EDSFF), and it may have an electrical interface, through which it may be connected to the host 705, that is any one of a plurality of interfaces suitable for persistent storage devices, including Peripheral Component Interconnect (PCI), PCI express (PCIe), Ethernet, Small Computer System Interface (SCSI), Serial AT Attachment (SATA), and Serial Attached SCSI (SAS). Each of the host 705 and the storage device 710 may include a processing circuit 715 (discussed in further detail below). The storage device 710 may also include persistent storage media 720 (e.g., NAND flash). The processing circuit 715 of the storage device 710 may perform (and, using the processing circuit 715 that it contains, the storage device 710 may perform) some or all of the methods described herein. FIG. 8 is a flowchart of a method, including sorting, at 805, two or more key-value pairs to form a sorted key-value pair set; determining, at 810, an address of a first key-value pair of the key-value pairs, the first key-value pair including a first key and a first value; determining, at 815, an address of a second key-value pair of the key-value pairs, the second key-value pair including a second key and a second value; and training, at 820, a first linear regression model to generate a first line corresponding to the key-value pairs, the training comprising training the first linear regression model with key-value pairs including the first key-value pair and the second key-value pair.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, a "subset" of a set is either the set or a proper subset of the set. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

The methods disclosed herein may be performed by one or more processing circuits; for example, the RMI circuit 135 may be, or be part of, or include, a processing circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a two-level indexing system for key-value persistent storage have been specifically described and illustrated herein, many modifications and variations will be apparent to those skilled in the art. Accordingly, it is to be understood that a two-level indexing system for key-value persistent storage constructed according to principles of this disclosure may be embodied other than as specifically described herein. The invention is also defined in the following claims, and equivalents thereof.

What is claimed is:

1. A method, comprising:
   sorting two or more key-value pairs to form a sorted key-value pair set;
   determining first address of a first key-value pair of the sorted key-value pair set, the first key-value pair including a first key and a first value;
   determining a second address of a second key-value pair of the sorted key-value pair set, the second key-value pair including a second key and a second value;
   using the first key-value pair, the first address of the first key-value pair, the second key-value pair, and the second address of the second key-value pair to train a machine learning model;
   providing an input key to the trained machine learning model;
   determining, by the trained machine learning model, a third address based on the input key; and
   storing a third key-value pair in the third address.

2. The method of claim 1, further comprising performing a data-moving operation in a block of a key-value persistent storage device, the performing of the data-moving operation comprising identifying the two or more key-value pairs.

3. The method of claim 2, wherein the data-moving operation is a wear-leveling operation.

4. The method of claim 1, further comprising storing the sorted key-value pair set in a region of storage, wherein the determining of the first address of the first key-value pair comprises determining the first address at which the first key-value pair is stored.

5. The method of claim 1, wherein the using of the first key-value pair, the first address of the first key-value pair, the second key-value pair, and the second address of the second key-value pair to train the machine learning model comprises training a first linear regression model to generate a first line based on the first key-value pair, the first address of the first key-value pair, the second key-value pair, and the second address of the second key-value pair.

6. The method of claim 5, wherein the determining of the third address for the third key-value pair comprises multiplying the input key by a factor and adding an offset, the factor and the offset being based on a slope and offset of the first line.

7. The method of claim 1, wherein the using of the first key-value pair, the first address of the first key-value pair, the second key-value pair, and the second address of the second key-value pair to train the machine learning model comprises training a first linear regression model to generate a first line based on the first key-value pair, the first address of the first key-value pair, the second key-value pair, and the second address of the second key-value pair, wherein the determining of the third address for the third key-value pair is based on the first line, the method further comprising:
   determining that a difference between the third address for the third key-value pair determined by the machine learning model and a real address of the third key-value pair exceeds a threshold; and
   in response to the determining that the difference exceeds the threshold, training a second linear regression model to generate a second line based on a first subset of the sorted key-value pair set.

8. The method of claim 7, wherein the threshold is a difference between the real address of the third key-value pair and a page boundary.

9. The method of claim 8, further comprising:
   receiving a command to access a fourth key-value pair; and
   determining that the fourth key-value pair is in the first subset.

10. The method of claim 9, further comprising determining a fourth address or the fourth key-value pair based on the second line.

11. The method of claim 10, further comprising reading, from persistent storage, a page, the fourth address for the fourth key-value pair being within the page.

12. A key-value persistent storage device, comprising:
   persistent storage;

a buffer; and
a processing circuit, configured to:
   sort two or more key-value pairs to form a sorted key-value pair set;
   determine a first address of a first key-value pair of the sorted key-value pair set, the first key-value pair including a first key and a first value;
   determine a second address of a second key-value pair of the sorted key-value pair set, the second key-value pair including a second key and a second value;
   use the first key-value pair, the first address of the first key-value pair, the second key-value pair, and the second address of the second key-value pair to train a machine learning model;
   provide an input key to the trained machine learning model;
   determine, by the trained machine learning model, a third address based on the input key; and
   store a third key-value pair in the third address.

13. The key-value persistent storage device of claim 12, wherein the processing circuit is further configured to perform a data-moving operation in a block of the key-value persistent storage device, the performing of the data-moving operation comprising identifying the two or more key-value pairs.

14. The key-value persistent storage device of claim 13, wherein the data-moving operation is a wear-leveling operation.

15. The key-value persistent storage device of claim 12, wherein the processing circuit is further configured to store the sorted key-value pair set in a region of storage, wherein the determining of the first address of the first key-value pair comprises determining the first address at which the first key-value pair is stored.

16. The key-value persistent storage device of claim 12, wherein the processing circuit being configured to train the machine learning model comprises the processing circuit being configured to:
   construct a first linear regression model to generate a first line based on the first key-value pair, the first address of the first key-value pair, the second key-value pair, and the second address of the second key-value pair.

17. The key-value persistent storage device of claim 16, wherein the processing circuit being configured to determine the third address of the third key-value pair comprises the processing circuit being configured to multiply the input key by a factor and adding an offset, the factor and the offset being based on a slope and offset of the first line.

18. The key-value persistent storage device of claim 12, wherein the processing circuit being configured to use the first key-value pair, the first address of the first key-value pair, the second key-value pair, and the second address of the second key-value pair to train the machine learning model comprises the processing circuit being configured to train a first linear regression model to generate a first line based on the first key-value pair, the first address of the first key-value pair, the second key-value pair, and the second address of the second key-value pair, wherein the processing circuit being configured to determine the third address for the third key-value pair includes the processing circuit being configured to determine the third address for the third key-value pair based on the first line,
   the processing circuit being further configured to:
      determine that a difference between the third address for the third key-value pair determined by the machine learning model and a real address of the third key-value pair exceeds a threshold; and
      in response to the processing circuit being configured to determine that the difference exceeds the threshold, train a second linear regression model to generate a second line based on a first subset of the key-value pairs.

19. The key-value persistent storage device of claim 18, wherein the threshold is the difference between the real address of the third key-value pair and a page boundary,
   the processing circuit being further configured to:
      receive a command to access a fourth key-value pair; and
      determine that the fourth key-value pair is in the first subset.

20. A key-value persistent storage device, comprising:
persistent storage;
a buffer; and
means for processing, configured to:
   sort two or more key-value pairs to form a sorted key-value pair set;
   determine a first address of a first key-value pair of the sorted key-value pair set, the first key-value pair including a first key and a first value;
   determine a second address of a second key-value pair of the sorted key-value pair set, the second key-value pair including a second key and a second value;
   use the first key-value pair, the first address of the first key-value pair, the second key-value pair, and the second address of the second key-value pair to train a machine learning model;
   provide an input key to the trained machine learning model;
   determine, by the trained machine learning model, a third address based on the input key; and
   store a third key-value pair in the third address.

\* \* \* \* \*